Feb. 21, 1961     J. F. BUCY, JR     2,972,733
METHOD AND APPARATUS FOR ANALYZING DATA
Filed July 19, 1955
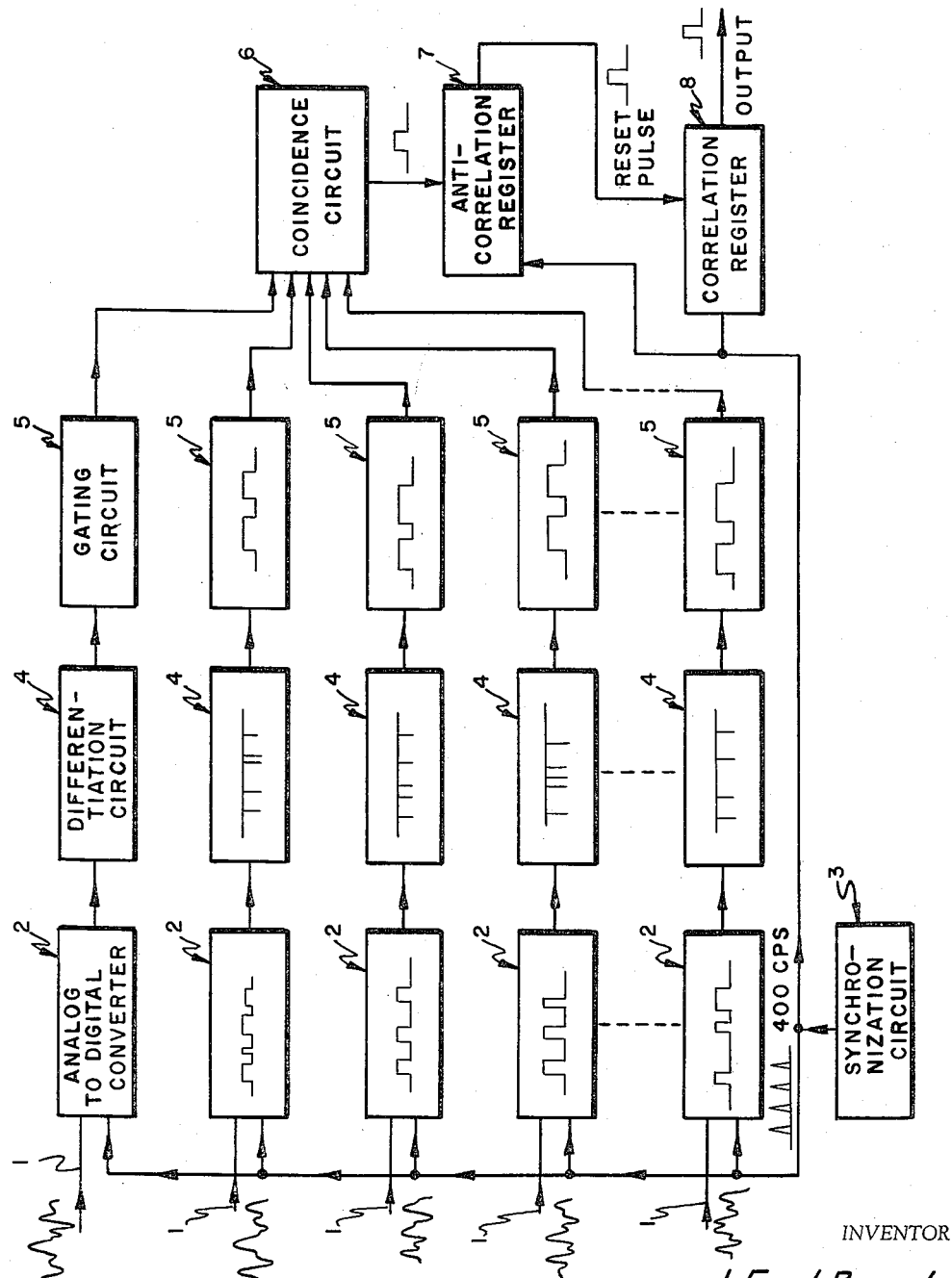
INVENTOR
*J. Fred Bucy, Jr.*
ATTORNEYS United States Patent Office 2,972,733
Patented Feb. 21, 1961

2,972,733

METHOD AND APPARATUS FOR ANALYZING DATA

J. Fred Bucy, Jr., Dallas, Tex., assignor to Texas Instruments Incorporated, Dallas, Tex., a corporation of Delaware Filed July 19, 1955, Ser. No. 523,017

12 Claims. (Cl. 340—15)

This invention relates generally to a method and apparatus to perform certain functions in data analysis processes and more specifically to a method and apparatus to perform the function of recognition and correlation of useful information signals contained on seismic reflection records or other types of data records.

The method most commonly used to generate waves for seismic surveying purposes is the detonation of an explosive charge located either on or above the surface of the earth or in a hole drilled in the earth. On detonating the charge, portions of the waves generated travel in a more or less direct path from the charge to the seismometers while other portions of the waves travel into the earth and are reflected back to the seismometers from layers where a change in velocity occurs. The seismometers pick up the direct traveling portions of the waves as well as the reflected portions of the waves and the various combinations received at the seismometers are converted into electrical signals which are then amplified and recorded on a visible or reproducible type record. Thus, it follows that the recording made after the shot is fired consists of waves containing no useful information or "noise" and reflected waves containing useful information or a "message." If the disturbance recorded by a seismometer moving in response to a seismic blast is defined as "signal," the general type of signal is made up of the message and noise and may be expressed as:

$$S = M + N$$

The accurate interpretation of visual records of seismic signals requires skill acquired only after much study and practice in the procedure known as reflection picking. In this procedure, visual and subjective criteria are employed in an effort to identify the messages in the complicated signal traces and to track seismic events of interest from trace to trace on a seismic record and from record to record over a seismic prospect. Even after great skill is acquired by a person in picking reflections, the steps of identification and correlation of the information signals are the most difficult and time consuming of the seismic exploration process.

In the present invention, electronic means are used to pick the seismic reflections from the records by identification of the message or information signals using as criteria similarity of the waveforms in amplitude, phase, and frequency content and the coincident occurrence of these similarities across several traces within a prescribed time interval. The device may be thought of as a non-linear filter which produces an output pulse only when the input signals meet the predetermined requisites of waveform similarity and coincident occurrence.

In the practice of the present invention, each of the various channels of the reflection picker receives signals reproduced from one of the several traces of a seismic recording previously produced in the field operations. In each channel, the signals are converted from their analog form to a digital form by synchronized analog-to-digital converters, differentiated and then used to trigger a gate generating circuit. The gate pulses from all of the channels are fed to a coincidence circuit. If the pulses from the various gate generators arrive simultaneously at the input of the coincidence circuit, a pulse is generated in the output of the coincidence circuit indicating that the prescribed number of signal traces correlate at that particular time. These output pulses from the coincidence circuit are then fed to an anti-correlation register circuit as a reset pulse.

The anti-correlation register receives, at other input terminals, pulses from the synchronization circuit. The register stores these pulses until it has received a predetermined number and saturates thereby producing an output pulse. However, if the anti-correlation register receives a reset pulse from the coincidence circuit before it saturates, the register is cleared and the output pulse is delayed until the prescribed number of input pulses have again been received.

The output pulses of the anti-correlation register are used as reset pulses for another register circuit called the correlation register. The operation of the correlation register is identical to that of the anti-correlation register except that a greater number of pulses are required at its input to produce saturation and, therefore, an output pulse. Because fewer pulses from the synchronization circuit are required to saturate the anti-correlation register than are required to saturate the correlation register, pulses from the output of the anti-correlation register continually clear and reset the correlation register before it can produce an output pulse, that is, unless the output pulses from the coincidence circuit clear and reset the anti-correlation register often enough to block the reset pulses to the correlation register until that circuit can saturate and produce an output pulse. Thus, when the seismic traces correlate to such a degree that the anti-correlation register output is delayed for the required period of time by the reset pulses from the coincidence circuit, the correlation register will become saturated and generate a pulse in the output of the system. In this manner, the correlation of the several seismic signals in regard to phase, amplitude, frequency content and coincident occurrence is "picked" as a reflection.

Accordingly, it is one object of the present invention to provide a means for electronically identifying and correlating useful information present in previously recorded data signals containing both "message" and "noise."

It is another object of the present invention to provide a faster and less expensive method of picking the reflection signals of seismic exploration signal data records.

It is a further object of the present invention to provide an automatic electronic seismic reflection picking device which is faster and more accurate than previously used visual methods because human judgment errors are eliminated.

It is a still further object of the present invention to provide a device using electronic circuits well-known in the art to pick the reflection signals of seismic exploration signal data records quickly and automatically.

Further objects and advantages of the present invention will become apparent from the following detailed description when taken in conjunction with the accompanying drawing in which:

Figure 1 illustrates, in schematic block diagram form, the circuit of the preferred embodiment of the digital seismic reflection picking device of the present invention.

Referring now to Figure 1, seismic signals, reproduced from recordings made in the field operations and with the normal moveout or signal delay due to seismometer spacing removed, are impressed on the input signal lines 1 of the various channels of the reflection picker. These recordings may be any of the several reproducible types commonly used to record the disturbances detected by the seismometers after the seismic shot blast such as magnetic disc, magnetic tape, variable area or variable density photographic recordings. Preferably, a separate input channel is provided for each trace on the record, that is, each seismometer station of the spread, but it is also possible to use only a limited number of channels and then selectively reproduce traces during several replays in order to reproduce the entire record.

The input signal lines 1 of each channel carry the input signal to an analog-to-digital converter circuit 2 which produces a series of square-wave pulses which are of a duration proportional to the average amplitude of the input signal over a definite period of time. The analog-to-digital converters may be any of several types of circuits suitable for the purpose such as, for example, the circuit commonly referred to as a phantastron. An explanation of phantastron type circuits may be found in Volume 19 of the MIT Radiation Laboratory Series at pages 195–204.

The several analog-to-digital converters 2 are triggered by a single synchronization circuit 3 to insure that all of the converters "fire" at exactly the same time and thus sample corresponding portions of the input signals from the various traces of the record. Any of the several types of astable multivibrator circuits described in Volume 19 of the MIT Radiation Laboratory Series at page 171 are suitable for use as the synchronization circuit 3. The output frequency of the synchronization circuit should be stable and, although not critical, it should be at least 400 c.p.s. in order that the incoming seismic signals will be sampled by the analog-to-digital converters at least once every 2.5 milliseconds. Thus, even the incoming signals at 200 c.p.s., considered to be the highest useful frequency for seismic purposes, will be sampled at least twice during each cycle.

The leading edges of the square-wave output pulses from the analog-to-digital converters 2 in the several channels coincide because all of the converters are "fired" by the same synchronization circuit 3. However, as stated above, the duration of these pulses is a function of the amplitude of the seismic input signal. These width modulated pulses from the converters are fed to differentiation circuits 4 in each channel which produce a sharp positive going spiked pulse from the leading edge of each square-wave signal impressed on it and a sharp negative going spiked pulse from each trailing edge of the square-wave signals. These pulses in each channel are used to trigger a gate generating circuit 5 in each channel. A gate is a pulse used to turn a circuit either on or off for a brief time interval corresponding to the pulse and is usually in the form of a square-wave. Since the positive pulses from each differentiation circuit coincide and contain no information, they are, in effect, discarded by using a gating circuit which is triggered by negative pulses only. The negative pulse train is then a position modulated pulse signal indicative of the changing amplitude of the incoming seismic signals which will trigger the gating circuits 5 in the channel to produce a train of position modulated positive square-waves of constant duration. Any of the monostable multivibrator circuits described in Volume 19 of the MIT Radiation Laboratory Series at page 166 or other suitable gating circuits of the triggered type may be used to generate these square-waves. Because the trigger pulses are themselves position modulated as a function of the amplitude of the original input seismic signals, the gates generated by the gating circuits are also position modulated. Although the gates may be of any duration or length sufficiently short to prevent overlapping of the succeeding gates, in the present illustration wherein the sampling of the input signal occurs at a frequency of 400 c.p.s., a gate length of approximately 250 microseconds has been found quite satisfactory.

The position modulated gates thus generated in each channel of the reflection picker are then fed to a single coincidence circuit 6. Coincidence circuits are well-known in the art and are used for the purpose of producing an output pulse when input pulses occur simultaneously on all or any predetermined number of the several input terminals. A coincidence circuit of the type using a plurality of crystal diodes connected in parallel between the grid of an amplifier tube and ground in such a manner that the grid is driven above tube cutoff only when an input signal is present on each diode is suitable for use with the present invention. Several other types of coincidence circuits suitable for use in the present invention are described in Nuclear Radiation Physics by Lapp and Andrews, Prentice Hall Inc., New York, N.Y., 1948. Each time the gate signals arrive simultaneously at the inputs of the coincidence circuit from the prescribed number of channels on output pulse is generated by the coincidence circuit. This pulse is used as the reset pulse for a binary counter circuit 7 called the anti-correlation register.

This anti-correlation register and another binary counter circuit 8 of the same type, called the correlation register, act in the following manner to indicate the presence of a seismic reflection in the input signal. The anti-correlation register 7 and the correlation register 8 each receive pulses from the synchronization circuit 3 at their inputs. Each register "stores" the pulses until it reaches saturation and produces an output pulse or until the register is cleared by a reset pulse from some other circuit. For the correlation register 8, this reset pulse is the output pulse of the anti-correlation register 7 due to saturation of that circuit. The two registers are set so that the anti-correlation register saturates with fewer input pulses than does the correlation register. Consequently, the correlation register is continually reset before it can produce an output pulse unless the output pulse train from the anti-correlation register is interrupted for a period long enough to allow the correlation register to saturate. The anti-correlation register output pulse train is interrupted for a short period each time this register is reset by the pulses generated by the coincidence circuit 6 in the manner explained previously.

Thus, when the various input signals to the system show definite similarity over a certain period of time, the coincidence circuit prevents the anti-correlation register from reaching saturation and therefore allows the correlation register to produce an output pulse indicating the presence of a reflection in the input signal.

The circuits used as the correlation register 8 and the anti-correlation register 7 are binary counter circuits of the type described by R. D. Kodis, S. Ruhman and W. D. Woo in "Magnetic Shift Register Using One Core Per Bit," 1953 Convention Record of the IRE, Part 7 (Electronic Computers) at page 38. However, any of the various other types of register circuits suitable for the purpose may be used.

The choice of the number of pulses needed to cause saturation in the two register circuits 7 and 8 will depend on the types of input signals to the reflection picker and the resolution and accuracy desired in the output. For the example shown here, wherein the sampling rate is 400 c.p.s., good results have been obtained with the correlation register 8 set to saturate at 16 pulses and the anti-coincidence register 7 set to saturate at 4 pulses. With these settings, correlation must occur over a period of at least 40 milliseconds with no period longer than 10 milliseconds without a correlation pulse in order for an output pulse to be produced indicating the presence of a reflection signal on the record.

The system output pulse, then, corresponds to a "picked" reflection but it will be displaced in time from the occurrence of the reflection in the input signal because of the finite time required to saturate the correlation register. Therefore, the arrival time of the reflection is obtained by making a constant time correction as follows:

$$T_a = T_p - nT_s$$

where $T_a$ = reflection arrival time,
$T_p$ = time of the output pulse from the correlation register,
$n$ = number of counts necessary to saturate the correlation register,
$T_s$ = period of the analog-to-digital sampling frequency.

For any particular run of this device, the quantity $nT_s$ is fixed. A commonly used value for $nT_s$ is 40 milliseconds.

As previously mentioned, the criteria used in the present invention for picking a reflection are similarity in waveform, amplitude, phase and coincident occurrence across a prescribed number of traces. The controlling factors which set the severity of the criteria for picking a reflection are:

a. The number of traces across which the reflection must occur.
  b. The length of time over which the traces must correlate.
  c. The number of allowable errors (points of non-correlation) within the time of correlation.
  d. The increment of time within which the reflection must occur to be counted as coincidence.

The coincidence circuit 6 may be adjusted to trigger on any prescribed number of coincident input pulses. The length of time over which the traces must correlate is determined by the capacity of the correlation register 8. The number of allowable errors is determined by the capacity of the anti-correlation register 7, and the increment of time within which the inputs to the coincidence circuit must occur in order to trigger the coincidence circuit is determined by the width of the gate generated by the gating circuit 5.

Factor $a$ is the primary factor for determining the probability of the "picked" reflection being a true reflection. Factors $b$, $c$, and $d$ determine the exactness in similarity of waveform, amplitude, and phase which the various traces must meet in order to correlate.

Thus, there has been described an automatic electronic digital seismic reflection picker capable of greatly simplifying and shortening the steps of preliminary analysis of seismic exploration data recording. Although the present invention has been illustrated using only one arrangement of circuits, various changes, substitutions and alterations still within the spirit and scope of the invention will be apparent to those skilled in the art. Therefore, it is intended that the scope of this invention be limited only as defined in the appended claims.

What is claimed is:

1. Apparatus for analyzing data signals comprising a plurality of signal channels, each of said channels including means to convert an analogue input signal to a series of signals the spacing of which is related to the amplitude of the analogue input signal, means to receive the converted signals from said plurality of channels and produce an output signal when signals from a predetermined number of said channels are received simultaneously, a first means producing output signals separated by substantially equal time intervals, a second means producing output signals separated by substantially equal time intervals, said first means arranged to delay producing an output signal upon receiving an output signal from said means to receive signals from said plurality of channels, and said second means arranged to delay producing an output signal upon receiving an output signal from said first means.

2. Apparatus for analyzing data signals as defined in claim 1 wherein said first means produces output signals separated by a shorter time interval than output signals produced by said second means.

3. Apparatus for analyzing data signals as defined in claim 1 wherein said means to convert an analogue input signal comprises means to produce pulses width modulated in accordance with the amplitude of said input signals and means to produce pulses position modulated in accordance with the width of said width modulated pulses.

4. Apparatus for analyzing data signals as defined in claim 1 including means to synchronize the operation of all of said means converting an analogue input signal.

5. Apparatus for analyzing data signals as defined in claim 4 wherein said means to synchronize the operation of all said means converting an input signal is further arranged to synchronize the operation of said first and second means producing output signals separated by substantially equal time intervals.

6. Apparatus for analyzing data signals comprising a plurality of signal channels, each of said channels provided with a triggered phantastron circuit arranged to produce square-wave pulses, each of said square-wave pulses of a duration proportional to the average amplitude of said input signal over a fixed period of time, a differentiation circuit arranged to receive said square-wave pulses and produce sharp trigger pulses corresponding to the trailing edges of said square-wave pulses, and a gating circuit of the monostable multivibrator type arranged to receive said sharp trigger pulses and produce therefrom constant duration gating pulses; means to produce a correlation output signal upon the coincident occurrence of said gating pulses at the outputs of a prescribed number of said plurality of signal channels comprising an amplifier device biased to a non-conductive state, a plurality of asymmetrically conductive devices each receiving gating pulses from a different one of said plurality of signal channels, said asymmetrically conductive devices arranged to cooperate to drive said amplifier device into a conductive state upon receiving signals simultaneously from a prescribed number of said signal channels; a first register means, a second register means, each said register means comprising a binary counter circuit, and a synchronization means comprising an astable multivibrator circuit arranged to deliver trigger pulses simultaneously to said first and said second register means and to each of said triggered phantastron circuits; said first register means arranged to produce an anti-correlation output signal upon receiving from said synchronization means a prescribed number of said trigger pulses, said first register means further arranged to receive signals from said means to produce a correlation output signal and to delay producing said anti-correlation output signal upon receiving said correlation output signal until said prescribed number of trigger pulses are again received; said second register means arranged to produce a system output signal upon receiving from said synchronization means a prescribed number of said trigger pulses greater than the number of said trigger pulses required to produce an anti-correlation output signal from said first register means, said second register means further arranged to receive said anti-correlation output signals from said first register means and to delay producing said system output signal upon receiving said anti-correlation output signal until said greater prescribed number of trigger pulses are again received.

7. A method of correlating analogue data signals which comprises position modulating separate trains of pulses in accordance with the amplitudes of the signals to be analyzed, generating a pulse whenever pulses from a predetermined number of said pulse trains occur simultaneously, generating a first series of pulses at a substantially constant repetition rate, generating from said first series of pulses a second series of pulses at a substantially constant repetition rate, generating a third series of pulses at a substantially constant repetition rate, interrupting said second series of pulses in response to the said pulse generated by the simultaneous occurrence of a predetermined number of pulses from said pulse trains thereby permitting said third series of pulses to continue uninterrupted indicative of input signal correlation.

8. A method of correlating analogue data signals as defined in claim 7 wherein the step of position modulating separate trains of pulses is accomplished by periodically sampling the input signals of each train, generating pulses of a width proportional to the amplitudes of said periodic samples and thereafter position modulating said trains of pulses in accordance with the width of said width modulated pulses.

9. A method of correlating analogue data signals as defined in claim 7 wherein the sequence rate of said second series of pulses at a substantially constant repetition rate is higher than the sequence rate of said third series of pulses at a substantially constant repetition rate.

10. A method of correlating analogue data signals as defined in claim 7 wherein the said third series of pulses at a substantially constant repetition rate is interrupted in response to pulses from said second series of pulses at a substantially constant repetition rate thereby indicating a lack of input signal correlation.

11. A method of correlating analogue data signals as defined in claim 8 wherein said periodic sampling is simultaneous for all of said data signals.

12. Apparatus for analyzing data signals comprising a plurality of signal channels, each of said channels including means to convert an analogue signal to a series of signals, the spacings of which are determined by the amplitude of the analogue input signal, and means to receive the converted signals from said signal channels and produce an output signal when signals from a predetermined number of said channels are received simultaneously.

References Cited in the file of this patent

UNITED STATES PATENTS

| | | |
|---|---|---|
| 2,484,352 | Miller | Oct. 11, 1949 |
| 2,529,666 | Sands | Nov. 14, 1950 |
| 2,643,819 | Lee et al. | June 30, 1953 |
| 2,677,104 | Chase | Apr. 27, 1954 |
| 2,752,092 | McDonal | June 26, 1956 |
| 2,779,428 | Silverman | Jan. 29, 1957 |
| 2,814,725 | Jacobs | Nov. 26, 1957 |